3,595,838
POLYURETHANE COATING COMPOSITIONS
Akira Ogino, Toyonaka, Japan, assignor to Takeda
   Chemical Industries, Ltd., Osaka, Japan
No Drawing. Filed May 22, 1968, Ser. No. 731,286
Claims priority, application Japan, May 23, 1967,
   42/32,727, 42/32,728
Int. Cl. C08g 22/06, 22/18; C09d 3/72
U.S. Cl. 260—77.5                                    3 Claims

ABSTRACT OF THE DISCLOSURE

The compositions of the disclosure comprises (1) a polyester polyol and (2) an isocyanate component. By using, as isocyanate component, an adduct of trimethylolpropane - $\omega,\omega'$ - diisocyanate (XDI) in specified molar ratio (1:7 to 1:16) and essentially free from unreacted XDI, it is possible to produce a two-can type polyurethane coating composition having superior weathering resistance and excellent mechanical properties. Details of desirable polyester polyol components, which contribute improved corrosion resistance to the coating, are also disclosed.

---

This invention relates to a two-can type polyurethane coating composition, more particularly, to a two-can type polyurethane coating composition comprising (1) a polyester polyol, as a polyol component, and (2) as an isocyanate component, an adduct of trimethylolpropane and dimethylbenzene-$\omega,\omega'$-diisocyanate which is prepared by allowing them to react with each other in a specified molar ratio.

The most typical example of hitherto known two-can type polyurethane coating compositions is that wherein an adduct of tolylene diisocyanate (TDI) and a low molecular polyol such as glycerine and trimethylolpropane is used as an isocyanate component. But the coating films produced from the hitherto known polyurethane coating compositions have a very poor weathering resistance and, particularly, are bound up with the defect that they tend to be colored yellow or yellowish brown upon outdoor exposure.

For overcoming this drawback, it has been proposed to use an adduct prepared by reacting about 3 mole parts of dimethylbenzene-$\omega,\omega'$-diisocyanate (XDI) and about one mole part of low molecular polyol in place of the above TDI adduct.

However, the known XDI-low molecular polyol adduct is hardly soluble in commonly used organic solvents such as benzene, toluene and xylene, and, what is worse, it has a very poor compatibility with a polyol component, and these properties of the adduct necessarily cause a fatal defect that the coating film prepared from the adduct and a polyol component has insufficient mechanical properties.

The present invention obviates the said defect by the use of, as isocyanate component, an adduct which is produced by subjecting trimethylolpropane (TMP) to reaction with XDI in a molar ratio of the former to the latter of 1:7 to 1:16, more desirably 1:9 to 1:12, followed by removing unreacted XDI. Namely, the two-can type polyurethane coating composition of the present invention, wherein the adduct mentioned just above is used as isocyanate component, can yield a coating film having superior weathering resistance and excellent mechanical properties.

Thus, it is an object of the present invention to provide a two-can type polyurethane coating composition which is easy to work and capable of yielding a coating film having superior weathering resistance and excellent mechanical properties.

As stated above, the XDI-TMP adduct used in the present invention is that prepared by subjecting TMP to a reaction with XDI in a molar ratio of the former to the latter of 1:7 to 1:16, more preferably, 1:9 to 1:12, followed by removing unreacted XDI.

When XDI is allowed to react with TMP in an amount of not more than 7 mole parts per mole of TMP, the produced adduct shows insufficient solubility in solvents and poor compatibility with polyester polyol, and adversely, when XDI is used in an amount of not less than 16 mole parts per mole of TMP, complex and troublesome procedures are required for removing unreacted XDI.

As the dimethylbenzene-$\omega,\omega'$-diisocyanate, any of the ortho, meta and para-compounds, or a mixture thereof may be utilized in the present invention.

The reaction is conducted optimally at a temperature of about 60 to about 80° C. without using any solvent.

After the reaction is completed, the unreacted XDI contained in the reaction mixture is removed. As the technique for removing unreacted XDI, so-called solvent extraction is desirably employed. That is, the reaction mixture is allowed to contact with a solvent at a temperature of about 20° to 60° C., a layer containing XDI-TMP adduct is separated, and the solvent is removed by distillation from the separated layer.

As the solvent for the extraction, a mixture of (1) an aliphatic and/or an alicyclic hydrocarbon and (2) an aromatic hydrocarbon is desirably used. The above-mentioned aliphatic hydrocarbon is, for example, pentane, hexane, heptane, octane or the like, and the alicyclic hydrocarbon is, for example, cyclohexane or cycloheptane, among others. On the other hand, benzene, toluene and xylene are typical examples of said aromatic hydrocarbon.

Among the extracting solvents, a mixture of benzene and hexane is most desirably employed.

The extraction can be carried out in batch-wise or in continuous process.

The extracting solvent is used in an amount of about 1 to about 4, more desirably about 2 to about 3, weight parts in case of continuous extraction and in an amount of about 2 to about 6, more desirably about 3 to about 5, weight parts in case of batch-wise extraction, relative to the weight of the reaction product. The weight ratio of the aromatic hydrocarbon relative to the aliphatic and/or alicyclic hydrocarbon generally ranges from about 3/1 to about 1/3, more desirably, from about 2/1 to about 1/2.

The contact with the extracting solvent can be effected once or twice or more, and when it is carried out twice or more, the same extracting solvent or a different extracting solvent can be used for each contact cycle.

The unreacted XDI transferred to the extractant layer can be recovered and used as XDI component to be reacted with TMP.

The extraction can be conducted at 20° to 60° C.

By the extraction, the amount of unreacted XDI contained in the reaction mixture can be reduced to not higher than about 1 weight percent, generally not higher than 0.5 weight percent.

As an amount of XDI to be reacted with TMP is increased, the amine equivalent of the XDI-TMP adduct prepared is reduced and the toluene tolerance thereof is increased. And, generally, the amine equivalent and the toluene tolerance of the XDI-TMP adduct prepared in the present invention fall within a range of about 320 to about 400 and about 150 to about 260 (calculated on a solution containing 75 weight percent of the adduct and 25 weight percent of ethyl acetate), respectively.

As the polyester polyol of the present invention, there is used any polyester polyol having at least two terminal OH groups, and use can be made of, for example, those described in "High Polymers, vol. XVI Polyurethanes: Chemistry and Technology Part 1" (1962) by J. H. Saunders and K. C. Frisch, published by Interscience Publishers, New York, N.Y., typical examples of which include (1) linear or branched hydroxyl polyesters prepared from di- and/or polycarboxylic acids such as succinic, glutaric, adipic, pimelic, suberic, sebacic, maleic, fumaric, itaconic, phthalic, isophthalic, terephthalic acid and their acid anhydrides, and di- and/or polyhydric alcohols such as ethylene glycol, propylene glycol, diethylene glycol, triethylene glycol, butylene glycol, trimethylol propane, glycerine, hexanetriol, pentaerythritol and the like, (2) modified polyester polyols prepared by modifying the above polyester polyols with fatty acids, monoglycerides of oils or fats, isocyanate compounds and the like, and (3) addition polymers containing ester linkages and OH groups in the molecule which are prepared by, for example, polymerizing a mono- or polyhydroxyalkyl ethylenically unsaturated carboxylic acid ester.

By using these polyester polyols as polyol component together with the afore-mentioned XDI-TMP adduct as isocyanate component, there can be prepared a polyurethane coating composition from which a coating film having superior weathering resistance and excellent mechanical properties can be produced.

And, particularly, by selecting, as the polyester polyol component, such specific polyester polyols as mentioned below, it is possible to obtain a polyurethane coating composition from which there can be yielded a coating film having particularly improved corrosion resistance besides superior weathering resistance and excellent mechanical properties.

These specific polyester polyols include the following:

(a) A fatty acid-modified polyester polyol having 4 to 7 OH groups in the molecule, a molecular weight of 200 to 600, preferably 250 to 450, per OH group and terminal mono- or diglyceride groups.

This polyester polyol is prepared by the following method:

At first, a triol is allowed to react with dicarboxylic acid in a molar ratio of triol/acid of about 2/5 in an inert gas such as carbon dioxide at a temperature of about 150° to 250° C., preferably about 170° to 230° C., until no water is produced any longer, whereby a polyester having four terminal carboxylic groups is produced.

As the triol, use is advantageously made of those having 3 to 6 carbon atoms, typical examples of which are glycerine, trimethylolethane, trimethylolpropane, hexanetriol; and as the dicarboxylic acid, aliphatic or aromatic dicarboxylic acids having 4 to 10, preferably 6 to 8 carbon atoms are usable, typical examples of which include isophthalic acid, phthalic acid, alkyl-substituted phthalic acid (e.g. t-butyl isophthalic acid, etc.), succinic acid, glutaric acid, adipic acid, azelaic acid, etc., and derivatives thereof such as acid anhydrides, acid halides, etc.

Then, 1 mole part of the produced carboxyl terminated polyester, which may be in a purified or unpurified form, is allowed to react with (1) about 4 mole parts of a monoglyceride of fatty acid, (2) about 4 mole parts of a triol and about 1 to about 4 mole parts of a higher fatty acid, (3) about 1 to about 3 mole parts of a triol and about 3 to about 1 mole parts of a monoglyceride of a fatty acid, or (4) about 1 to about 3 mole parts of a triol, about 3 to about 1 mole parts of a monoglyceride of a fatty acid and about 1 to about 3 mole parts of a higher fatty acid, at a temperature of 170° to 230° C. until the acid value of the resultant becomes less than about 10, more preferably less than about 5, whereby the carboxyl terminated polyester is changed into a hydroxy terminated and fatty acid modified polyester polyol having, per molecule, 4 terminal OH groups in case of (1), 7 to 4 terminal OH groups in case of (2), 5 to 7 terminal OH groups in case of (3) and 4 to 6 terminal OH groups in case of (4).

In the following table, molar ratio of reactants and terminal OH groups per molecule of the resultant are illustratively but non-limitatively given.

THE THEORETICAL MOLAR RATIO OF REACTANTS AND NUMBER OF OH GROUPS CONTAINED IN THE RESULTANT

| Reactants and molar ratio employable in this method | | | | Number of OH groups contained in one mole of the resultant |
|---|---|---|---|---|
| Carboxyl terminated polyester | Monoglyceride of fatty acid | Triol | Higher fatty acid | |
| 1 | 4 | | | 4 |
| 1 | | 4 | 1 | 7 |
| 1 | | 4 | 2 | 6 |
| 1 | | 4 | 3 | 5 |
| 1 | | 4 | 4 | 4 |
| 1 | 3 | 1 | | 5 |
| 1 | 2 | 2 | | 6 |
| 1 | 1 | 3 | | 7 |
| 1 | 1 | 3 | 1-3 | 6-4 |
| 1 | 2 | 2 | 1-2 | 5-4 |
| 1 | 3 | 1 | 1 | 4 |

As the triol in this reaction, there can be used those described above. As the higher fatty acid, there can be employed straight-chain or branched higher fatty acids containing 6 to 20, more preferably 8 to 18 carbon atoms, such as saturated fatty acids (e.g. caprylic acid, capric acid, lauric acid, 2-ethylhexylic acid, palmitic acid, stearic acid, arachic acid, etc.) and unsaturated fatty acids (e.g. palmitoleic acid, oleic acid, linoleic acid, etc.) and a mixture thereof, and crude or purified mixtures obtained on hydrolysis of oil or fat consisting mainly of the above acid (e.g. oil or fat containing saturated fatty acid component, such as coconut oil, palm oil, palm kernel oil, and the like, and oil or fat containing unsaturated fatty acid component, such as cottonseed oil, soybean oil, castor oil, and mixture thereof). There may advantageously be used a mixture of higher than about 70 weight percent of a saturated fatty acid and less than about 30 weight percent of an unsaturated fatty acid, and a mixture of higher than about 70 weight percent of oil or fat containing saturated fatty acid component and less than about 30 weight percent of oil or fat containing unsaturated fatty acid component. As the monoglyceride of fatty acid, there can be used monoglycerides of the aforementioned straight-chain or branched higher fatty acids, or crude or pure mixed monoglycerides prepared from oils or fats containing the above higher fatty acid components (e.g. coconut oil, palm oil, palm kernel oil, cottonseed oil, soybean oil and castor oil, etc.).

(b) A copolymer having a molecular weight of about 1500 to about 8000 and OH number of about 30 to about 180, preferably about 35 to about 70, which is prepared from hydroxyethyl methacrylate and a compound of the following formula

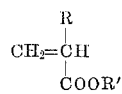

(wherein R is hydrogen or methyl, R′ is alkyl having 1 to 4 carbon atoms).

As a compound of the above formula, there can be enumerated methyl acrylate, ethyl acrylate, methyl methacrylate, ethyl methacrylate, etc. and a mixture thereof.

Hydroxyethyl methacrylate is allowed to react with a compound of the above formula in an amount of 7 to 42 weight parts relative to the total monomer.

The reaction is carried out at a temperature of about 60° to about 120° C., preferably about 80° to about 100° C., in the presence of a solvent (e.g. methyl acetate, ethyl acetate, butyl acetate, toluene, xylene or a mixture thereof etc.).

In this reaction, styrene may be coemployed with the above components in an amount of not higher than 50 weight percent relative to the total monomer.

(c) A polyester polyol having 3 OH groups in the molecule and a molecular weight of about 250 to about 500 per OH group, which is prepared by reacting 3 to 8 mole parts of adipic acid, 3 to 8 mole parts of glycol and 1 mole part of triol.

As the glycol, use is desirably made of those having 2 to 8 carbon atoms, typical examples of which are ethylene glycol, 1,3-propylene glycol, diethylene glycol, dipropylene glycol, 1,3-, 1,4- and 2,3-butylene glycol, hexanediol, pentanediol, neopentyl glycol, 2,2,4-trimethyl-1,3-pentanediol, etc.

As the triol, use is desirably made of those having 3 to 6 carbon atoms, typical examples of which are trimethylolethane, trimethylolpropane, 1,2,6-hexanetriol, etc.

The reaction is carried out at a temperature of about 150° to about 250° C., preferably about 170° to about 230° C. until the acid value of the resultant becomes less than about 10, preferably, less than about 5.

(d) An isocyanate-modified polyester polyol produced by reacting a polyester having a molecular weight of 500 to 3000, preferably 800 to 1500, which is prepared by reacting adipic acid and a glycol together with or without a triol, and XDI in a molar ratio of $0.95 \leq NCO/<1.0$.

The polyester to be reached with XDI can be prepared from adipic acid and glycol having 2 to 10 carbon atoms (e.g. ethylene glycol, 1,4-butylene glycol, diethylene glycol, neopentyl glycol, cyclohexane dimethanol, decamethylene glycol, etc.) in per se conventional manner.

In this method, a triol may be coemployed with adipic acid and glycol in a ratio of less than 20 equivalent percent relative to the total of the glycol and the triol. As the triol, use is desirably made of those having 3 to 6 carbon atoms, typical examples of which are glycerine, trimethylolethane, trimethylolpropane, 1,2,6-hexanetriol, etc.

The reaction of polyester and XDI is carried out at a temperature of about 60° to about 100° C. until substantially no NCO group is determined.

In this reaction, as a chain extender, glycol may be coemployed with the above components in a ratio of less than half equivalent relative to the polyester. As the glycol, use is desirably made of those having 2 to 10 carbon atoms, typical examples of which are ethylene glycol, butylene glycol, diethylene glycol, neopentyl glycol, cyclohexane dimethanol, decamethylene glycol, etc.

The present composition can be prepared by mixing the isocyanate component (XDI-TMP adduct) with the polyester polyol component in a molar ratio of NCO/OH of about 0.8 to about 1.5.

Into the present composition, there may be incorporated such additives as pigments, dyes (e.g. titanium oxide, Fast-Yellow, etc.), solvents, viscosity regulators (e.g. vinyl polymers, colloidal silica, etc.), fillers, antioxidants (e.g. hydroquinone, BHT, BHA, etc.), leveling agents (e.g. cellulose acetate-butylate, silicone oil, etc.), and the like. These additives are preferably premixed with the polyester polyol component.

The composition is applied by any of the conventional means such as brushing, flow-coating, spraying, etc.

The compositions in this invention can thus be applied to a wide variety of substrates, e.g. plates, metal sheets, wall-board, and many other articles made of wood, metal, plastics, concrete, fiber, glass, etc.

A composition so applied can completely be cured even at room temperature (about 15° to about 30°) or desirably by heating, to give polyurethane coating film which does not become yellowed even after exposure to atmosphere for a long period of time and has other good mechanical properties and high corrosion resistance.

For the purpose of a better understanding of this invention, the following illustrative but non-limitative examples are given.

EXAMPLE 1

(A) Synthesis of isocyanate component 134 weight parts of molten trimethylopropane is added dropwise to 1974 weight parts of dimethylbenzene-ω,ω′-diisocyanate (a mixture of 70 weight parts of m-isomer and 30 weight parts of p-isomer) which is preheated at 65° C. under constant stirring. Then, the mixture is kept at the same temperature for 2 to 3 hours to allow the reaction to take place. The reaction mixture contains about 65 to 75 weight parts of unreacted XDI. The mixture is heated at about 40° C. and is charged into a countercurrent multistage liquid extractor (theoretical plate number 10, inner capacity of 3000 cc.) from the top thereof at a rate of 100 volume parts/min., while a mixture of 40 weight parts of benzene and 60 weight parts of hexane which is previously heated at about 50° C. is charged into the extractor from the bottom thereof at a rate fo 350 volume parts/min. After the system in the extractor has reached a stationary state, the residue flowing out of the tower bottom is transferred to a distiller wherein it is concentrated under reduced pressure to remove a major portion of the benzene and hexane. To thus-concentrated product is added ethyl acetate so as to yield a 75% solution of XDI-TMP adduct, which contains no more than about 0.5% of unreacted XDI and shows an amine equivalent of 362.

The solution flowing out of the tower top is transferred to a recovering distiller, in which the solvent is recovered. The distillation residue contains about 3 weight parts of the adduct, a small amount of the solvent and unreacted XDI. The distillation residue is put into use as XDI component to be reacted with TMP.

EXAMPLE 2

134 weight parts of molten trimethylolpropane is added dropwise to dimethylbenzene-ω,ω′-diisocyanate (a mixture of 70 weight parts of m-isomer and 30 weight parts of p-isomer) in various amounts described in Table 1 at a temperature of 60° C. under constant stirring and with introduction of nitrogen gas. Then, the mixture is heated at 70° C. for 2 hours to allow the reaction to take place. The reaction mixture is shaken with a mixture of benzene and hexane (ratio=4/6 by weight) in an amount of 5 times as much by weight as that of the reaction mixture, at room temperature. The upper layer is separated, followed by being subjected to distillation under reduced pressure to remove the solvent.

Thus-obtained reaction product is made into a 75 weight percent solution in ethyl acetate. On the solution, unreacted XDI content, amine equivalent and toluene tolerance are measured. The result is as follows:

TABLE 1

| | Amount of XDI, weight parts | Molar ratio of TMP/XDI | Unreacted XDI, weight percent | Amine equivalent | Toluene tolerance [1] | Compatibility with a polyester polyol [2] |
|---|---|---|---|---|---|---|
| A | 1,316 | 1/7 | <0.5 | 390 | 180 | Excellent. |
| B | 1,692 | 1/9 | <0.5 | 370 | 240 | Do. |
| C | 1,974 | 1/10.5 | <0.5 | 362 | 240 | Do. |
| D | 2,820 | 1/15 | <0.5 | 353 | 240 | Do. |
| Reference 1 | 564 | 1/3 | <0.5 | 525 | 10 | Poor. |
| Reference 2 | 752 | 1/4 | <0.5 | 451 | 60 | Slight. |

[1] 2.0 grams of the sample (75 weight percent solution of XDI-TMP adduct in ethyl acetate) is taken into a test tube, to which toluene is added dropwise until fogging occurs, and the total amount of toluene added is recorded.

The toluene tolerance is calculated by means of the following equation:

$$\text{Toluene tolerance} = \frac{\text{Amount of toluene added (ml.)}}{\text{Sample (2.0 grams)}} \times 100$$

[2] It can be concluded that the higher the above toluene tolerance becomes, the more readily is the sample soluble in aromatic organic solvents. Polyester polyol used in the compatibility test is the one which is prepared from 3 moles of adipic acid, 2 moles of 1,4-butyleneglycol and 2 moles of hexanetriol and has an acid value of 2 and an hydroxy equivalent of 210.

As some other referential samples, adduct solutions are prepared by the same manner as above, using TDI in place of XDI. These solutions are subjected to measurement of their unreacted TDI content, amine equivalent and in the same manner as above.

The result is as follows:

TABLE 2

| | Amount of TDI, weight parts | Molar ratio of TMP/TDI | Unreacted TDI, weight percent | Amine equivalent |
|---|---|---|---|---|
| Reference: | | | | |
| 3 | 522 | 1/3 | <0.5 | 410 |
| 4 | 706 | 1/4 | <0.5 | 330 |
| 5 | 870 | 1/5 | <0.5 | 315 |

EXAMPLE 3

(B) Synthesis of polyester polyol component 146 weight parts of adipic acid and 243 weight parts of trimethylolethane are heated at 180° C. to 200° C. while the water then produced is removed by blowing a small amount of carbon dioxide gas into the reaction system, until the reaction mixture shows an acid value of about 5, at the end of which time 592 weight parts of phthalic anhydride is added ot the reaction system, and the whole mixture is heated for one hour under the same conditions as above, whereby a polycarboxyl-terminated polyester having an acid value of 226 is obtained.

To the polyester are added 411 weight parts of trimethylolpropane and 282 weight parts of monoglyceride of palm oil fatty acid (96% purity), and the mixture is heated under the same conditions as above for 8 hours to produce modified polyester which has an acid value of 3.4, 7 OH groups per molecule and an hydroxy equivalent of 224, being very viscous, pale yellow and transparent at room temperature.

EXAMPLE 4

Using 740 weight parts of phthalic anhydride and 271 weight parts of trimethylolpropane, a polycarboxyl-terminated polyester having an acid value of 222 is prepared in the same manner as in Example 3.

To the polyester are added 542 weight parts of trimethylolpropane and 400 weight parts of lauric acid, and the mixture is treated in the same manner as in Exampie 3 to yield hydroxyl-terminated saturated polyester resin which has an acid value of 3.3, 6 OH groups per molecule and an hydroxy equivalent of 310, being a pale yellow solid (softening point 37° C. to 42° C.) at room temperature.

EXAMPLE 5

740 weights parts of phthalic anhydride and 268 weight parts of trimethylolpropane are heated at 180 to 220° C. until the resultant shows an acid value of about 215. To the resultant are added 407 weight parts of trimethylolpropane, 401 weight parts of palm oil fatty acid and 282 weight parts of a monoglyceride of palm oil fatty acid (96% purity), and the mixture is heated at 180 to 220° C. for 10 hours. The above procedure yields a hydroxy-terminated saturated polyester which has an acid value of 3.5, 5 OH groups per molecule and an hydroxy equivalent of 395, being yellow in color, transparent, and very viscous at room temperature.

EXAMPLE 6

Using 733 weight parts of phthalic anhydride and 268 weight parts of trimethylolpropane, a polycarboxyl-terminated polyester having an acid value of 222 is produced in the same manner as in Example 5.

To the polyester are added 536 weight parts of trimethylolpropane and 801 weight parts of palm oil fatty acid, and the mixture is treated in the same manner as in Example 5. The above procedure yields a polyester which has an acid value of 5.5, 5 OH groups per molecule and an hydroxy equivalent of 550, being very viscous, pale yellow in color, and transparent.

EXAMPLE 7

Using 740 weight parts of phthalic anhydride and 270 weight parts of trimethylolpropane, a polycarboxyl-terminated polyester of acid value of 215 is produced in the same manner as in Example 5. To the polyester are added 536 weight parts of trimethylolpropane and 569 weight parts of stearic acid, and the mixture is treated in the same manner as in Example 5. In this manner, a hydroxy-terminated saturated polyester resin is obtained. The resin is a yellow transparent solid (softening point of 35 to 40° C.) at room temperature and has an acid value of 4.4 and an hydroxy equivalent of 320 (OH%=5.3 by weight).

EXAMPLE 8

| | |
|---|---|
| Ethyl acrylate | 100 weight parts. |
| Ethyl methacrylate | 114 weight parts. |
| Methyl methacrylate | 200 weight parts. |
| Hydroxyethyl methacrylate | 130 weight parts. |
| Benzoyl peroxide | 0.5 weight percent per total monomer. |
| Butyl acetate (solvent) | 66.6 weight percent per total monomer. |

The above components are admixed and heated at a temperature of 80° C. for 5 hours to produce a copolymer which has a molecular weight of about 2000 (by V.P.O.), an hydroxy equivalent of 550 and viscosity (Gardener) of $Z_3$ at 25° C. The polymerization rate is 99% based upon the monomer used.

EXAMPLE 9

| | Weight parts |
|---|---|
| Trimethylolpropane | 134 |
| Adipic acid | 584 |
| 1,2-propylene glycol | 304 |

The above components are admixed and heated at 180 to 220° C. for 10 hours to prepare polyester polyol which has an acid value of 4, 3 OH groups per molecule and an hydroxy equivalent of 288, and is pale yellowish brown and very viscous liquid at room temperature.

EXAMPLE 10

| | Weight parts |
|---|---|
| Trimethylolpropane | 134 |
| Adipic acid | 876 |
| Ethylene glycol | 186 |
| Dipropylene glycol | 402 |

The above components are admixed and reacted under the same conditions as in Example 9 to prepare polyester polyol which has an acid value of 4, 3 OH groups per molecule and an hydroxy equivalent of 320, and is pale yellowish brown and very viscose liquid at room temperature.

EXAMPLE 11

| | Weight parts |
|---|---|
| Polyester polyol prepared from adipic acid and 1,4-butylene glycol (molecular weight of about 1000) | 690 |
| Dimethylbenzene-ω,ω'-diisocyanate | 188 |
| Diethylene glycol | 36 |

The above components are dissolved in ethyl acetate, and heated at 70° C. for 10 hours to prepare isocyanate-modified polyester polyol which has a non-volatile content of 35 weight percent and Gardner-viscosity of U-V at 25° C.

EXAMPLE 12

(C) Production of polyurethane coating composition (1) Various 75% solutions of isocyanate components in ethyl acetate, which are prepared according to Example 2, and 75% solutions of various polyester polyol components in butyl acetate, which are prepared according to the preceding Examples 3 to 10, are admixed in a molar ratio of NCO/OH=1.2, and the respective mixtures are diluted with 100 weight parts of a mixed solvent (ethyl acetate/butyl acetate/cellosolve acetate/toluene= 1/1/2/1 by weight) to prepare polyurethane coating compositions.

(a) Each of the above manufactured compositions is applied onto a glass plate in a 0.1 mm. thickness, kept standing at a temperature of 25° C. with 50% RH for a week so as to allow them to be cured. Hardness of the so-cured films is measured.

(b) Each of the above manufactured compositions is applied onto a metal plate in 0.1 mm. thickness, followed by treatment in the same manner as in (a) to yield cured films. The cured films are subjected to measurement of their mechanical properties other than hardness, water immersion test and humidity test.

(2) 100 weight parts each of 75% solutions of various polyester polyol in ethyl acetate, which are prepared according to the preceding Examples 3 to 10 is homogeneously admixed with 60 weight parts of titanium dioxide (rutile type), 10 weight parts of butyl acetate and a small amount of half-second cellulose acetate-butylate. Each of the mixtures is mixed with 75% solution of isocyanate component in ethyl acetate, prepared according to Example 2, in a molar ratio of NCO/OH=1.2. Then each of the thus-prepared substances is diluted with 210 weight parts of mixed solvent (ethyl acetate/butyl acetate/cellosolve acetate/toluene=1/1/2/1 by weight). Each of the diluted compositions is applied onto a metal plate in 0.1 mm. thickness, followed by treatment in the same manner as in (a) to produce cured film. Weathering resistance of each of the cured films is measured, and the test results in (1)-(a), (1)-(b) and (2) are summarized in the following Table 3.

TABLE 3

| | Example 2—C | | | | | | | | | | | Reference 1 | Reference 3 |
|---|---|---|---|---|---|---|---|---|---|---|---|---|---|
| Polyester polyol component | Ex. 3 | Ex. 4 | Ex. 5 | Ex. 6 | Ex. 7 | Ex. 8 | Ex. 9 | Ex. 10 | DP-800[1] | DP-1100[2] | DP-1100[2] | Ex. 5 | DP-1100[2] |
| Dry-through (hrs.) | 1¼ | 2 | 2 | 2⅜ | 1½ | ½ | 16 | 16 | 2⅔ | 4 | 4 | 1 | 4 |
| Mechanical properties: | | | | | | | | | | | | | |
| Sward hardness | 62 | 64 | 38 | 58 | 58 | 66 | 14 | 10 | 36 | 30 | 30 | 50 | 56 |
| Cross-out adhesion (percent) | 100 | 100 | 100 | 100 | 100 | 100 | 100 | 100 | 100 | 100 | 100 | 50 | 100 |
| Erichsen test (mm.) | 6 | 8 | 8 | 8 | 8 | 8 | 8 | 8 | 8 | 8 | 8 | 4 | 8 |
| Bending test (mm.) | 4 | 2 | 2 | 2 | 2 | 2 | 2 | 2 | 2 | 2 | 2 | 10 | 2 |
| Du Pont's impact test (inch, g., cm.) | ¼,500,50 | ¼,500,10 | ¼,500,50 | ¼,500,50 | ¼,500,50 | ¼,500,50 | ¼,500,50 | ¼,500,50 | ¼,500,10 | ¼,500,30 | ¼,500,30 | ¼,500,30 | ¼,500,50 |
| Weathering resistance:[3] | | | | | | | | | | | | | |
| Light resistance | Good | Good | Good | Good | Good | Good | Good | Good | Good | Good | Good | Good | Yellowing |
| Gloss retention (percent) | 100 | 100 | 100 | 100 | 100 | 100 | 80 | 80 | 75 | 85 | 85 | 85 | 35 |
| Water immersion test[4] (25° C., tap water) after a week | No. 8 MD | No. 10 | No. 10 | No. 10 | No. 10 | No. 6D | No. 10 | No. 10 | No. 4D | No. 4D | No. 4D | No. 4D MD | No. 8M |
| Humidity test[4] (50° C., 100% R.H. for a week) | No. 8F | No. 10 | No. 10 | No. 10 | No. 10 | No. 8M | No. 10 | No. 10 | No. 4D | No. 4D | No. 4D | No. 8M | No. 10 |

[1] Registered trade name for polyester polyol comprising 0.5 mole of phthalic anhydride, 2.5 moles of adipic acid and 4.1 moles of trimethylolpropane.
[2] Registered trade name for polyester polyol comprising 3.0 moles of adipic acid, 2.0 moles of 1,4-butylene glycol and 2.0 moles of hexane triol.
[3] Measured after 600 hrs.' exposure to ultraviolet ray by using Weather-O-Meter with 2 carbon arc lamps.
[4] By ASTM D-714—F=Few, M=Medium, MD=Medium dense, D=Dense.

EXAMPLE 13

100 weight parts of polyester polyol prepared according to Example 11 is admixed with the following weight parts of isocyanate component prepared according to Example 2–A. The mixture is applied onto a metal plate by brushing and heating at 120° C. for 15 minutes to produce cured films.

The properties of the films are as follows:

TABLE 4

| Isocyanate component (weight parts) | 5 | 10 | 15 |
|---|---|---|---|
| Properties: | | | |
| Tensile strength (kg./cm.$^2$) | 340 | 360 | 320 |
| 100% modulus (kg./cm.$^2$) | 20 | 40 | 80 |
| Elongation at break (percent) | 520 | 380 | 250 |
| Weathering resistance, light resistance [1] | Good | Good | Good |
| Retention of tensile strength (percent) | 70 | 70 | 70 |

[1] After 100 hrs. exposure to ultraviolet ray by using Weather-O-Meter with 2 carbon arc lamps.

What is claimed is:

1. A process for the preparation of a trimethylolpropane/dimethylbenzene-ω,ω'-diisocyanate adduct which comprises reacting one mole of trimethylolpropane with from 9 to 12 moles of dimethylbenzene-ω,ω'-diisocyanate at an elevated temperature and removing excess unreacted dimethylbenzene-ω,ω'-diisocyanate from the thus-obtained reaction product.

2. A process according to claim 1 wherein the elevated temperature is within the range of from 60° to 80° C. and the reaction is effected in the absence of any solvent.

3. An article coated with a cured film of a polyurethane coating composition, which coating composition is prepared by mixing an isocyanate component and a polyester polyol component in an NCO/OH molar ratio of about 0.8 to 1.5, the isocyanate component being a trimethylolpropane/dimethylbenzene-ω,ω'-diisocyanate adduct prepared according to the process of claim 1, said adduct being essentially free from unreacted dimethylbenzene-ω,ω'-diisocyanate, the polyester polyol being a member selected from the group consisting of (a) a fatty acid-modified polyester polyol having 4 to 7 OH groups in a molecule, a molecular weight of 200 to 600 per OH group and terminal mono or diglyceride groups, (b) a polymer having a molecular weight of 1500 to 8000 and OH number of 30 to 180 which is prepared by reacting hydroxyethyl methacrylate, a compound of the formula

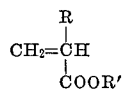

wherein R is hydrogen or methyl and R' is alkyl having 1 to 4 carbon atoms, and 0 to 50 weight percent of styrene relative to the total monomer, (c) a saturated polyester polyol having 3 OH groups in a molecule and a molecular weight of 250 to 500 per OH group which is prepared by reacting adipic acid, a glycol of 2 to 5 carbon atoms and a triol of 3 to 6 carbon atoms and (d) an isocyanate-modified polyester polyol produced by reacting (1) polyester having a molecular weight of 500 to 3000 which is prepared by reacting adipic acid, a glycol of 2 to 10 carbon atoms, and 0 to 20 equivalent percent of a triol of 3 to 6 carbon atoms relative to the total of the glycol and the triol, and (2) dimethylbenzene-ω,ω'-diisocyanate, in a molar ratio of $0.95 \leq NCO/OH < 1.0$, the reaction between (1) and (2) being carried out with a glycol of 2 to 10 carbon atoms in an amount of from 0 to one-half equivalent relative to the polyester.

References Cited

UNITED STATES PATENTS

| 2,374,136 | 4/1945 | Rothrock | 260—22 |
| 3,255,500 | 6/1966 | Engel et al. | 260—22 |
| 3,349,049 | 10/1967 | Seiwert et al. | 260—22 |

FOREIGN PATENTS

| 729,741 | 3/1966 | Canada | 260—22 |

DONALD E. CZAJA, Primary Examiner

R. W. GRIFFIN, Assistant Examiner

U.S. Cl. X.R.

117—124, 161; 260—22, 31.2, 33.2, 37, 75, 858, 859